(12) United States Patent
Kumar

(10) Patent No.: US 7,483,869 B2
(45) Date of Patent: Jan. 27, 2009

(54) RULE TEMPLATES

(75) Inventor: Janaki P. Kumar, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 193 days.

(21) Appl. No.: 10/824,106

(22) Filed: Apr. 14, 2004

(65) Prior Publication Data
US 2005/0246303 A1    Nov. 3, 2005

(51) Int. Cl.
G06F 17/00    (2006.01)
G06N 5/02    (2006.01)

(52) U.S. Cl. .......................................... 706/47; 706/48
(58) Field of Classification Search .................. 706/1, 706/15, 45, 19, 47, 46, 48, 50, 60, 11; 700/1, 700/90; 715/505, 506, 507; 435/7.1; 707/10; 704/9, 1
See application file for complete search history.

(56) References Cited

U.S. PATENT DOCUMENTS

| | | | |
|---|---|---|---|
| 6,057,841 A * | 5/2000 | Thurlow et al. | 715/809 |
| 6,249,807 B1 | 6/2001 | Shaw et al. | |
| 6,282,565 B1 | 8/2001 | Shaw et al. | |
| 6,529,863 B1 * | 3/2003 | Ball et al. | 704/1 |
| 2002/0091695 A1 * | 7/2002 | Morwood | 707/10 |
| 2003/0129659 A1 * | 7/2003 | Whelihan et al. | 435/7.1 |

OTHER PUBLICATIONS

'Teach yourself SAP R/3' :Sharpe Simon, Gambrel Bryan, 1999, Macmillan Computer Pub 15,59,.*
'SAP R/3 Implementation Guide':Hernandez, Elechiguerra, Bueno, Servera, 1999, McGraw Hill, 15, 18, 46. 51, 82, 83, 84, 85, 86, 144, 184, 185, 206, 211, 424, 477.*
'SAP R/3 Implementation Guide':Hernandez, Elechiguerra, Bueno, Servera, 1999, McGraw Hill.*
Java in a Nutshell. Flanagan, 2002, O'Reilly, 4th edition, pp. 66-67.*
U.S. Appl. No. 10/777,420, filed Feb. 12, 2004, Kumar.
"CRM Systems Section" *CRMBuyer Magazine,* obtained at http://www.crmbuyer.com/perl/story/20690.html, printed from the Internet on Nov. 17, 2003.
Starmanns, "Rule-Based Personalization in mySAP CRM E-Commerce", *SAP AG,* 2003, 78 pages.

* cited by examiner

*Primary Examiner*—David R Vincent
*Assistant Examiner*—Peter Coughlan
(74) *Attorney, Agent, or Firm*—Fish & Richardson P.C.

(57) ABSTRACT

One embodiment provides a computer-implemented method for creating a reusable template for use in a text-processing system. In this embodiment, the method includes using a graphical user interface (GUI) to display a representation of a condition of a user-defined rule that may be used to process textual information. The condition includes an attribute name, an operator, and an attribute value. Upon receipt of input from a user via the GUI, the method further includes creating a template that has a condition based upon the condition of the user-defined rule. The condition of the rule template includes the attribute name and the operator from the corresponding condition of the user-defined rule. The condition of the rule template also includes an attribute-value placeholder that is associated with the attribute value from the corresponding condition of the user-defined rule.

15 Claims, 9 Drawing Sheets

RULE TEMPLATES

TECHNICAL FIELD

This invention relates to the use of rule templates for use in a computing system.

BACKGROUND

Text-processing systems may often be required to process a high volume of textual information. For example, an Email Response Management System (ERMS) may need to process as many as 400,000 incoming customer email messages each day. These incoming email messages may relate to any number of different business scenarios. For example, certain customers may submit service order requests to their service provider via email. Other customers may submit complaints or assistance requests to certain providers via email. To effectively handle this high volume of incoming email, the ERMS must be capable of interpreting these messages in an intelligent fashion and then routing the messages to the appropriate personnel, if necessary. As such, text-processing systems must be capable of making intelligent decisions to determine how to best process textual information.

To make these types of decisions, text-processing systems typically utilize a set of rules. A rule-base engine can then implement these rules to trigger actions and make the appropriate decisions. Typically, a trained and skilled administrator will need to create and modify the rules used by the rule-based engine by writing programming code. In a complex text-processing system, there may be a large number of different rules to administer. As such, the administrator may need to spend a significant amount of time creating new rules for use in the text-processing system.

Certain systems allow highly trained and skilled administrators to create and use rule templates. Typically, these administrators create the templates using shell scripting or other programming languages. After the scripts are created, business users are then able to select from and use a predetermined set of these rule templates via a graphical user interface (GUI). The users can then insert values into various fields of these templates to define the specific rules that are to be used by the text-processing system.

SUMMARY

Various embodiments of the present invention are provided herein. One embodiment provides a computer-implemented method for creating a reusable template for use in a text-processing system. In this embodiment, the method includes using a graphical user interface (GUI) to display a representation of a condition of a user-defined rule that may be used to process textual information. The condition includes an attribute name, an operator, and an attribute value. Upon receipt of input from a user via the GUI, the method further includes creating a template that has a condition based upon the condition of the user-defined rule. The condition of the rule template includes the attribute name and the operator from the corresponding condition of the user-defined rule. The condition of the rule template also includes an attribute-value placeholder that is associated with the attribute value from the corresponding condition of the user-defined rule.

Various embodiments of the invention may allow an administrator in a text-processing system, such as an Email Response Management System (ERMS), to maximize his or her efficiency by reusing rules that are used to process textual information without having to know many of the underlying technical details of the system or having to use shell scripting or other programming languages. When a rule has the potential to be reused several times within the system, the administrator may save this rule as a rule template. The rule template contains the structure of the rule, but does not include any hard-coded values. Subsequently, when the administrator wants to create a similar rule, he or she can simply select a rule template and add the appropriate values.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
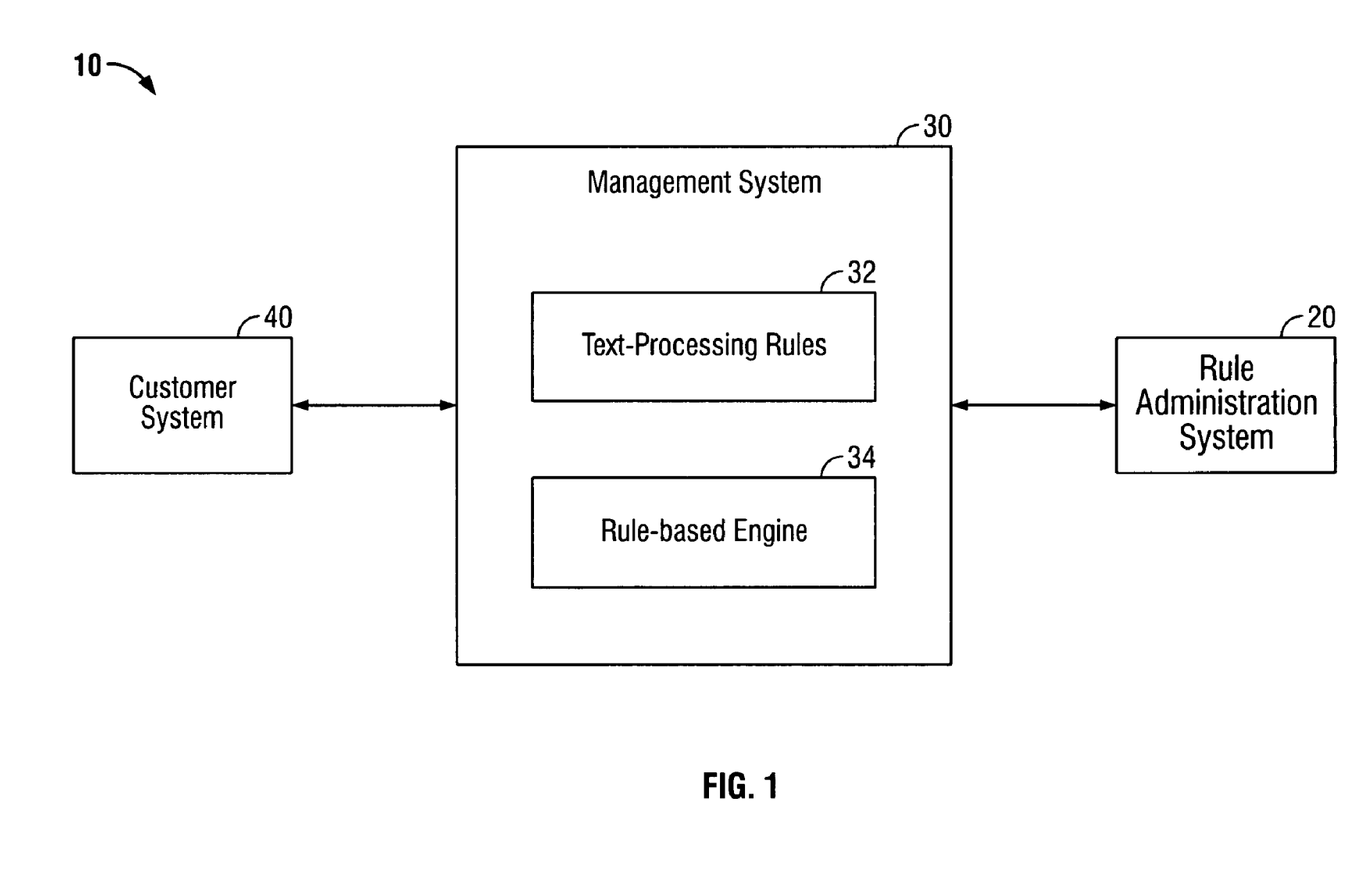
FIG. 1 is a block diagram of a system that may be used to administer and manage text-processing rules, according to one embodiment.

FIG. 1 is a block diagram of a system 10 that may be used to administer and manage text-processing rules, according to one embodiment. In this embodiment, the system 10 includes a rule administration system 20, which includes a processor, a memory, a storage device, and an input/output device (as shown and later described in FIG. 8). The system 10 also includes a management system 30 and a customer system 40. The text-processing rules 32 may be administered at design time in the rule administration system 20, and may then later be utilized at run time by the management system 30 when processing incoming information from a customer system 40. For example, the management system 30 may utilize the text-processing rules 32 when processing incoming email information from the customer system 40.

In one embodiment, the text-processing rules 32 each include a set of conditions and actions. As will be described below, an administrator may utilize the rule administration system 20 to create and modify the text-processing rules 32 using rule templates. The management system 30 includes a rule-based engine 34 that processes the text-processing rules 32.

The customer system 40 is also coupled to the management system 30. In one embodiment, the customer system 40 contains a processor, a memory, a storage device, and an input/output device, similar to the rule administration system 20. During operation, the customer system 40 sends textual information to the management system 30. For example, the customer system 40 may send email or search query information to the management system 30. The management system 30 is then capable of processing the incoming textual information by using the text-processing rules 32 and the rule-based engine 34. The rule-based engine 34 processes the textual information along with rule conditions in the text-processing rules 32 to determine if certain actions are to be triggered. For example, in one embodiment, the rule-based engine 34 may determine that an automatic acknowledgement or response email message is to be sent back to the customer system 40. This acknowledgement or response will be triggered by the rule-based engine 34 as a result of an action of one of the text-processing rules 32. Any number of different actions may also be triggered by the rule-based engine 34.

Figure 2A:
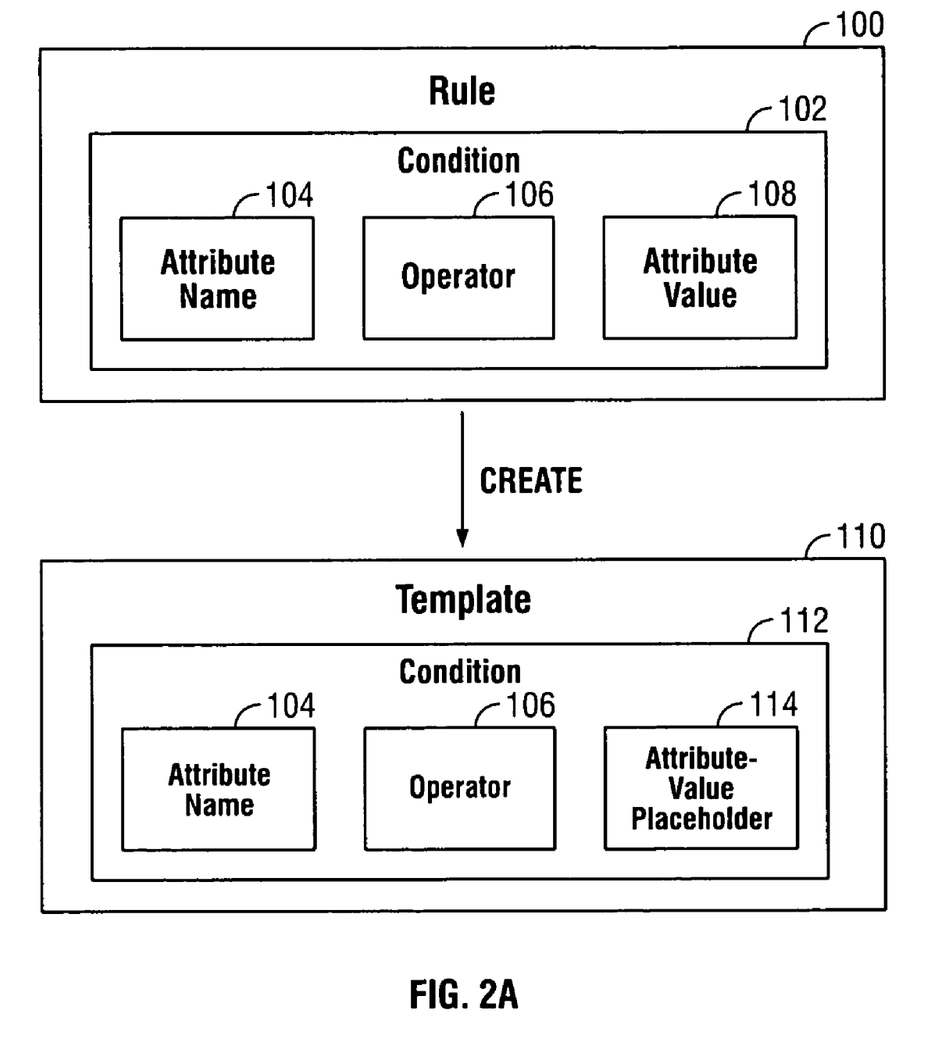
FIG. 2A is a diagram of a rule template created from a user-defined rule, according to one embodiment.

FIG. 2A is a diagram of a rule template 110 created from a user-defined rule 100, according to one embodiment. In this embodiment, the user-defined rule 100 may be used to process textual information, such as information contained within an email message or a search query. For example, an administrator using the rule administration system 20, shown in FIG. 1, may create or modify the rule 100, which is then used by the rule-based engine 34 in the management system 30 when processing incoming email information sent from the customer system 40.

The user-defined rule 100 contains a condition 102 that includes an attribute name 104, an operator 106, and an attribute value 108. Upon receiving a command from a user, such as an administrator, the rule 100 is used to create the rule template 110. The rule template 110 includes a condition 112 that corresponds to the condition 102 of the user-defined rule 100. The condition 112 of the rule template 110 includes the attribute name 104 and the operator 106 from the corresponding condition 102 of the user-defined rule 100. The condition 112 of the rule template 110 further includes an attribute-value placeholder 114 that is associated with the attribute value 108 from the corresponding condition 102 of the user-defined rule 100. In one embodiment, the rule template 110 is stored in a repository that is accessible to a user.

The attribute name 104 may include any form of name to identify an attribute, such as "country." The operator 106 may include a logical or other form of operator, such as "contains." The attribute value 108 includes the value corresponding to the attribute name 104. For example, if the attribute name 104 is set to "country," then the attribute value 108 may be set to "United States."

In one embodiment, the user-defined rule 100 contains an additional condition that also contains an attribute name, an operator, and an attribute value. In this embodiment, the condition 102 and the additional condition for the rule 100 are connected by a logical operator, such as "and" or "or." In this fashion, the rule 100 may include a series of different conditions that are logically related. The rule template 110 also contains an additional condition that corresponds to the additional condition of the rule 100. The additional condition of the rule template 110 includes the attribute name and the operator from the corresponding additional condition of the rule 100, and also includes an attribute-value placeholder that is associated with the attribute value from the corresponding additional condition of the rule 100.

The user-defined rule 100 may be used to process any form of textual information, such as information contained within email messages or within textual search queries. A rule designer, such as an administrator, may be able to initially define the rule 100 and then generate the rule template 110 without having to use a shell scripting or other programming language. When a rule, such as the rule 100, has the potential to be reused several times within a system, the administrator may select an option via a user interface to create a rule template, such as the rule template 110. The rule template 110 contains the structure of the rule 100, but does not include any hard-coded values, such as the attribute value 108. Instead, the rule template 110 includes an attribute-value placeholder 114. Subsequently, when the administrator wants to create a similar rule, he or she can simply select the rule template 110 and add an appropriate value into the attribute-value placeholder 114.

Figure 2B:
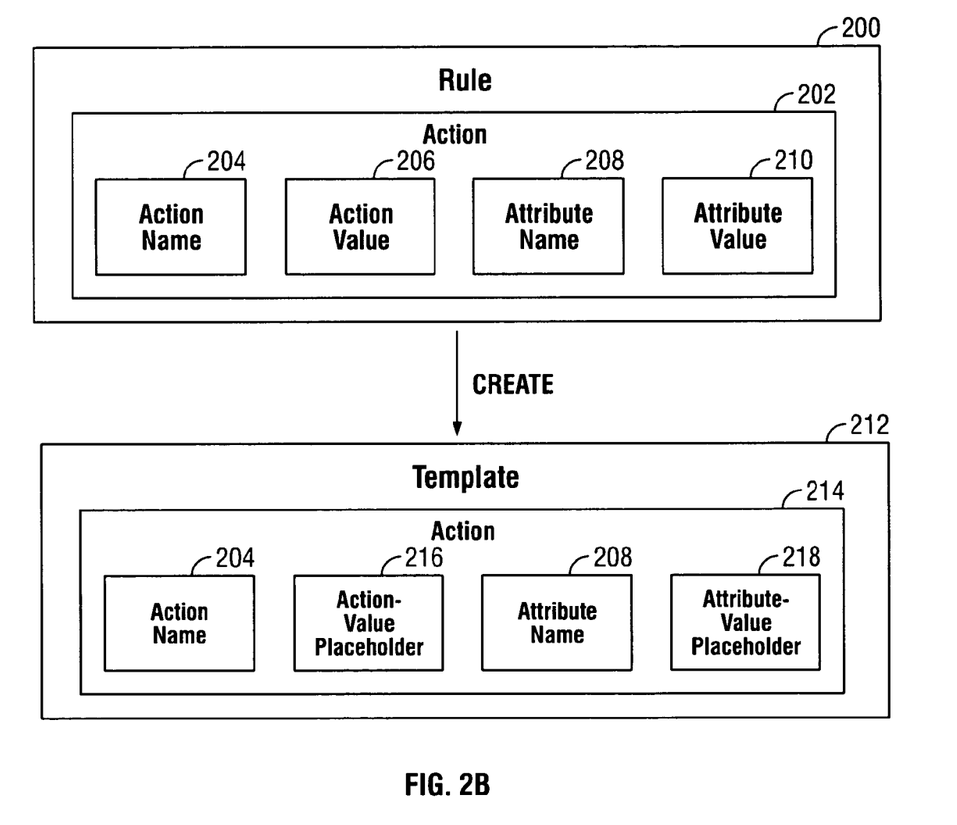
FIG. 2B is a diagram of a rule template created from a user-defined rule, according to another embodiment.

FIG. 2B is a diagram of a rule template 212 created from a user-defined rule 200, according to another embodiment. In this embodiment, the user-defined rule 200 may also be used to process textual information. The user-defined rule 200 contains an action 202 that includes an action name 204 and an action value 206. As an example, if a redirection action were desired, the action name 204 could be "redirect," and the action value 206 could contain the redirection address. Upon receiving a command from a user, such as an administrator, the rule 200 is used to create the rule template 212. The rule template 212 contains an action 214 that corresponds to the action 202 of the user-defined rule 200. The action 214 of the rule template 212 includes the action name 204 from the corresponding action 202 of the user-defined rule 200. The action 214 of the rule template 212 further includes an action-value placeholder 216 that is associated with the action value 206 from the corresponding action 202 of the user-defined rule 200.

In one embodiment, the action 202 of the user-defined rule 200 further includes an attribute name 208 and an attribute value 210. In this embodiment, the action 214 of the rule template 212 includes the attribute name 208 from the corresponding action 202 of the user-defined rule 200. The action 214 also includes an attribute-value placeholder 218 that is associated with the attribute value 210 from the corresponding action 202 of the user-defined rule 200. When a user, such as a rule designer or administrator, uses the template 212 to create new rules, he or she may enter a value into the attribute-value placeholder 218 for the corresponding attribute name 208. Similarly, the user can enter a value into the action-value placeholder 216 for the corresponding action name 204 when creating a new rule.

Figure 2C:
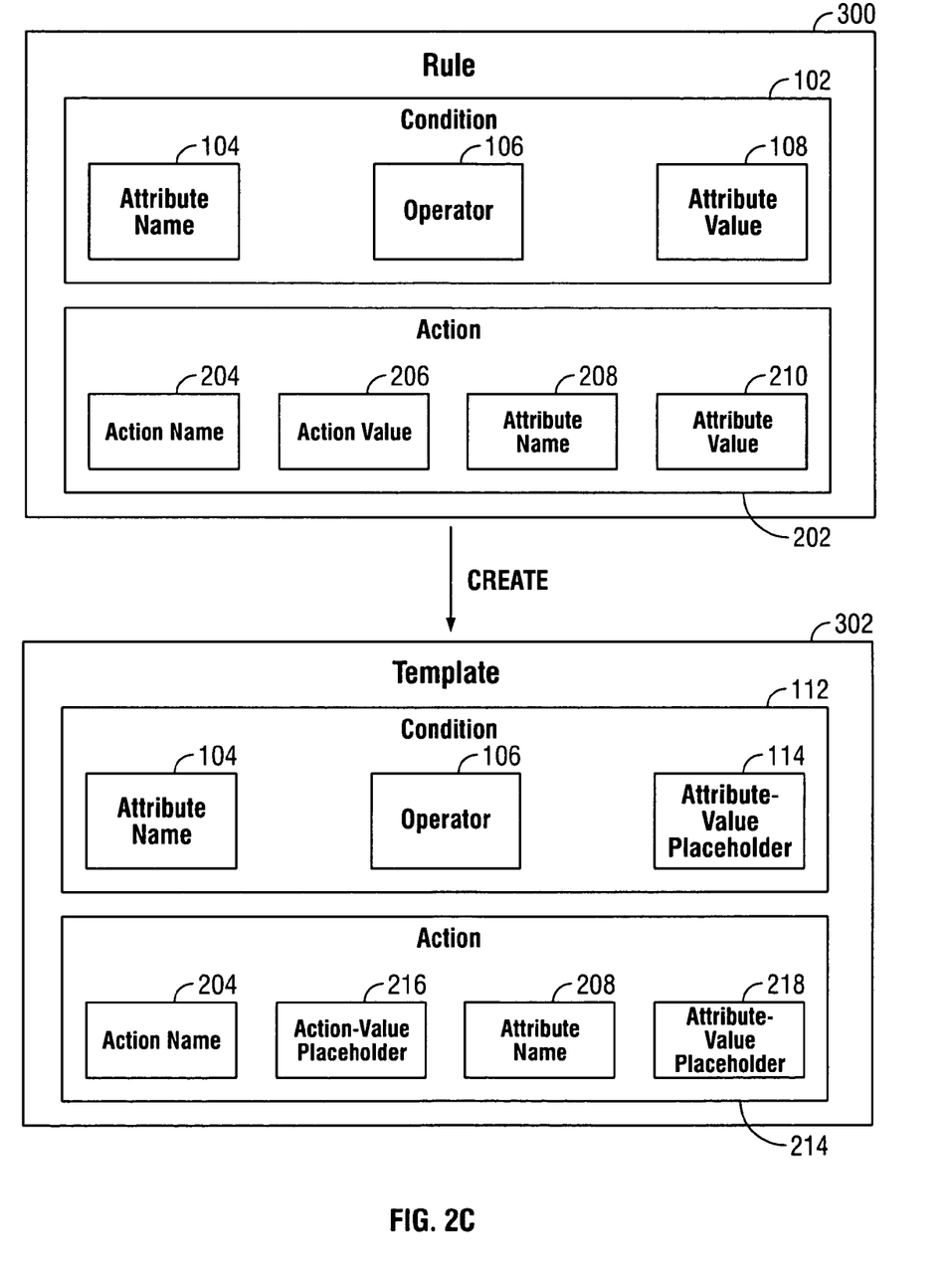
FIG. 2C is a diagram of a rule template created from a user-define rule, according to yet another embodiment.

FIG. 2C is a diagram of a rule template 302 created from a user-define rule 300, according to yet another embodiment. In this embodiment, the user-defined rule 300 contains both the condition 102 and the action 202. As described above, the condition 102 contains the attribute name 104, the operator 106, and the attribute value 108. The action 202 contains the action name 204, the action value 206, the attribute name 208, and the attribute value 210. When the rule 300 includes both the condition 102 and the action 202, the template 302 may be created that also includes both the condition 112 and the action 214. The user may make a selection within the GUI to initiate the creation of the template 302, such as in the example shown in FIG. 7. As described above, the condition 112 contains the attribute name 104, the operator 106, and the attribute-value placeholder 114. The action 214 contains the action name 204, the action-value placeholder 216, the attribute name 208, and the attribute-value placeholder 218.

Figure 3:
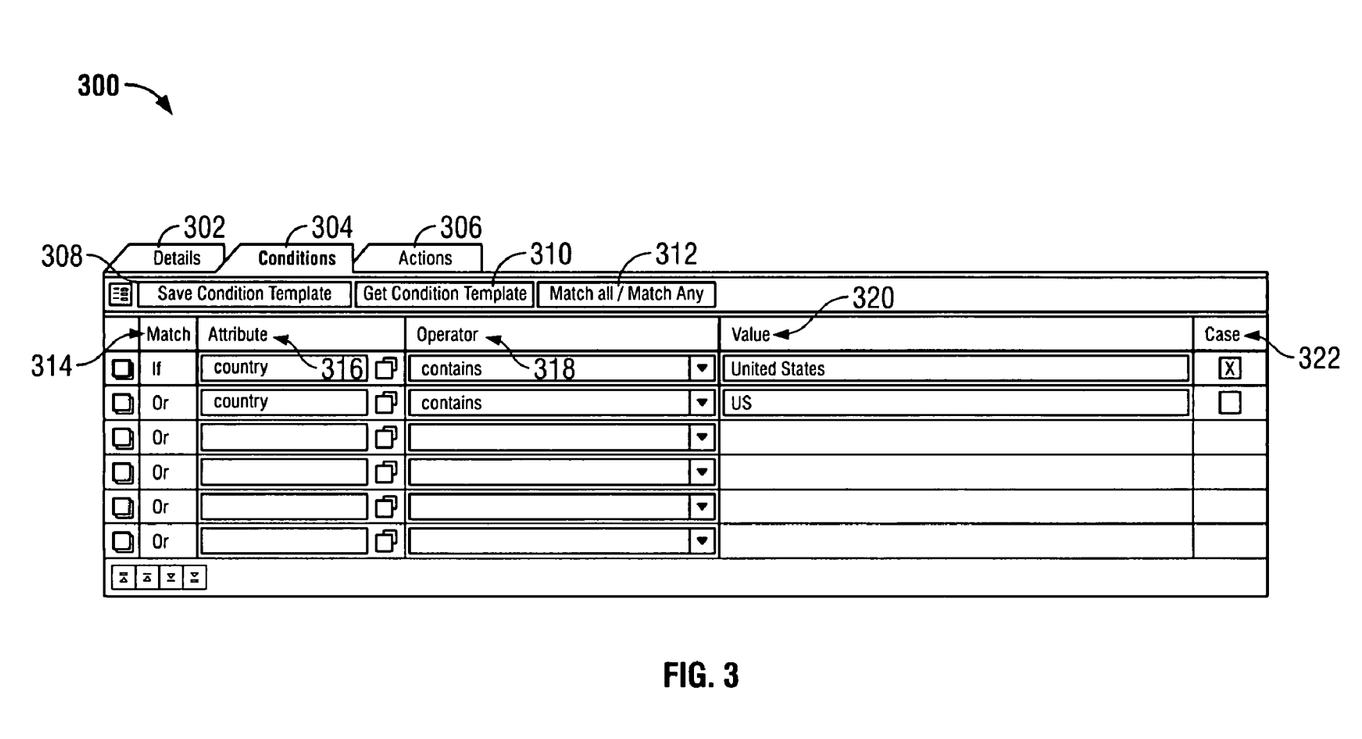
FIG. 3 is a screen diagram of a graphical user interface (GUI) that is used for viewing and modifying rule conditions, according to one embodiment.

FIG. 3 is a screen diagram of a graphical user interface (GUI) 300 that is used for viewing and modifying rule conditions in the rule administration system 20 shown in FIG. 1, according to one embodiment. In this embodiment, a user may use the GUI 300 to view a set of rule conditions and modify one or more aspects of these conditions. The GUI 300 includes a details tab 302, a conditions tab 304, and an actions tab 306. In FIG. 3, the user has selected the conditions tab 304, which is highlighted in bold. The GUI 300 also contains buttons 308, 310, and 312. As will be described in more detail below in reference to FIG. 4, the user may select the button 308 to save a condition template or the button 310 to obtain a condition template. The user may select the button 312 to toggle the matching operations for the set of conditions that are listed. The user can make a selection either to match all or to match any of the listed conditions. If the user chooses to match all of the conditions, then each of these conditions will be separated by a logical "AND" operator. If, however, the user instead chooses to match any of the conditions, then each of these conditions will be separated by a logical "OR" operator. The matching operations are shown in a column 314. The user may individually specify the matching operations by altering the settings in the column 314.

The user may specify an attribute for each listed condition in a column 316. As shown in FIG. 3, the user has selected an attribute "country" for each of the two listed conditions. The user may specify an operator for each listed condition in a column 318. For example, in FIG. 3, the user has selected an operator "contains" for each condition. The user could have also selected an operator "does not contain" or any number of different operator options. The user specifies an attribute value for each condition using the column 320. In one embodiment, the user may directly type in entries for the fields shown in the columns 316, 318, and 320. In other embodiments, the user may utilize GUI menus to select the entries for these fields. Finally, using a column 322, the user may specify whether the values shown in the column 320 are case sensitive.

Figure 4:
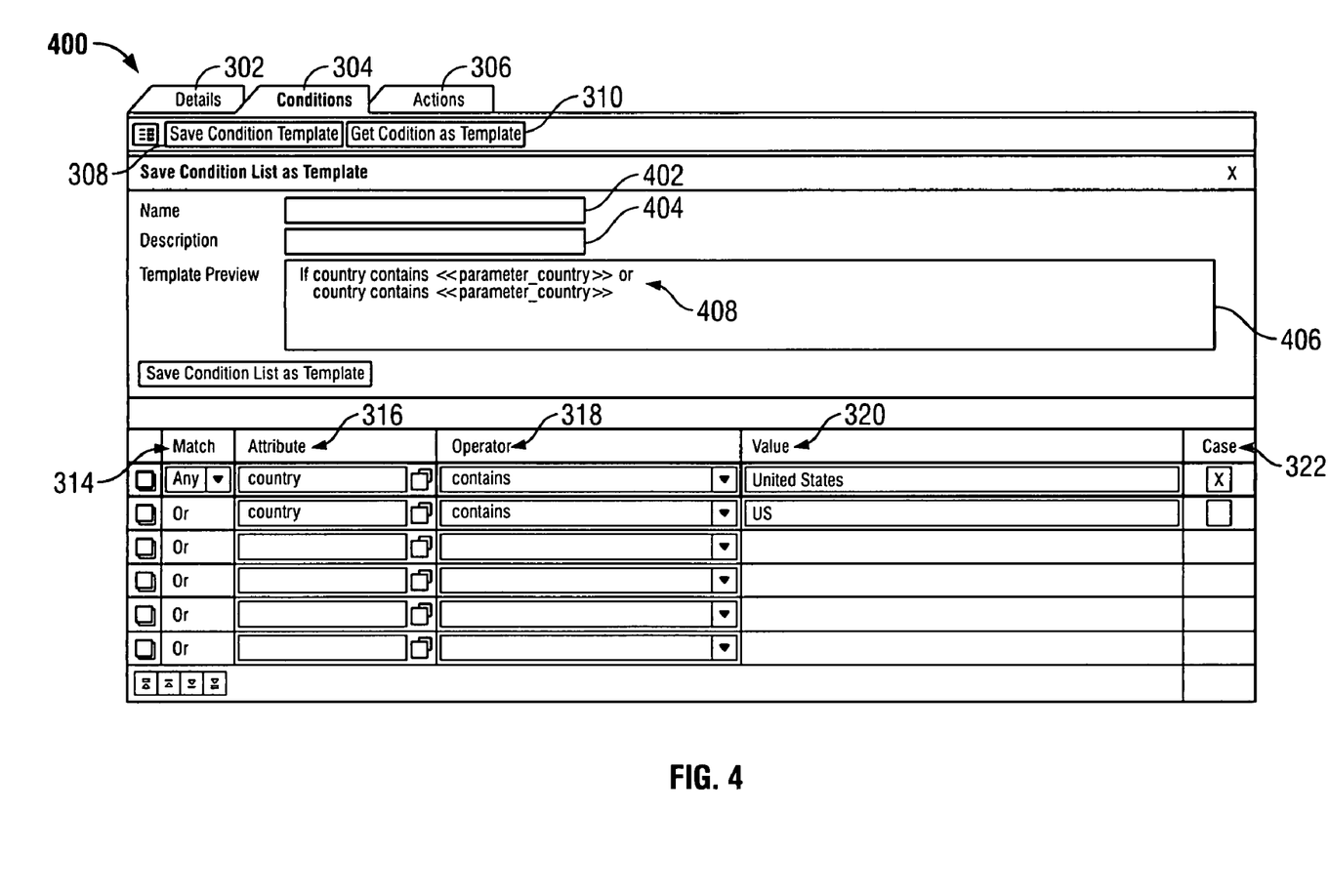
FIG. 4 is a screen diagram of a GUI that is used for creating and viewing a rule template that is based upon the rule conditions shown in FIG. 3.

FIG. 4 is a screen diagram of a GUI 400 that is used for creating and viewing a rule template that is based upon the rule conditions shown in FIG. 3. In the GUI 400, the tab 304 is again highlighted, indicating that the user has selected the conditions tab. The columns 314, 316, 318, 320, and 322 specify the details of the two conditions that the user has created, as also shown in FIG. 3. Once these conditions have been defined, the user may select button 308 to create and save a rule template. This rule template will be based on the conditions specified by the user in the columns 314, 316, 318, 320, and 322.

As shown in FIG. 4, the user may select a template name in a text box 402 upon selection of the button 308. The user may also specify a template description in a text box 404. A preview area 406 displays a representation 408 of a template that has been created from the user-specified conditions. As is shown in the preview area 406, the representation 408 of the rule template also contains two distinct conditions. These conditions are based upon the user-specified conditions shown in the columns 314, 316, 318, 320, and 322. For example, these conditions each have the attribute "country" and the operator "contains". However, the conditions shown in the representation 408 of the rule template includes attribute-value placeholders rather than actual attribute values. As shown in FIG. 4, each condition shown in the representation 408 of the rule template includes an attribute-value placeholder "<<parameter_country>>" rather than an attribute value (such as "United States" or "US"). The attribute-value placeholder "<<parameter_country>>" contains a placeholder name "parameter_country" surrounded by the symbols "<<" and ">>". In one embodiment, the placeholder name is based on the attribute name of the corresponding condition of the user-defined rule. For example, as shown in FIG. 4, the placeholder name "parameter_country" is based on the attribute name "country" shown in the column 316 for each condition.

When viewing the representation 408 of the rule template in the preview area 406, a user, such as a rule designer, may be able to identify the attribute-value placeholders that have been created in the various conditions of the rule template by looking for the symbols "<<" and ">>" that mark off the specified placeholder names. For example, the rule designer is able to identify the attribute-value placeholders "<<parameter_country>>" in each of the conditions shown in the representation 408 of the rule template. When the designer later wishes to create a custom rule that is based upon this rule template, he/she may select a button 310 to get and use the template for customization. Once the designer selects the button 310, the designer will be able to replace the attribute-value placeholders with values to be used in a customized rule. In this fashion, the designer is able to reuse the rule template several times when creating various different rules based on a common format specified by the rule template.

Figure 5:
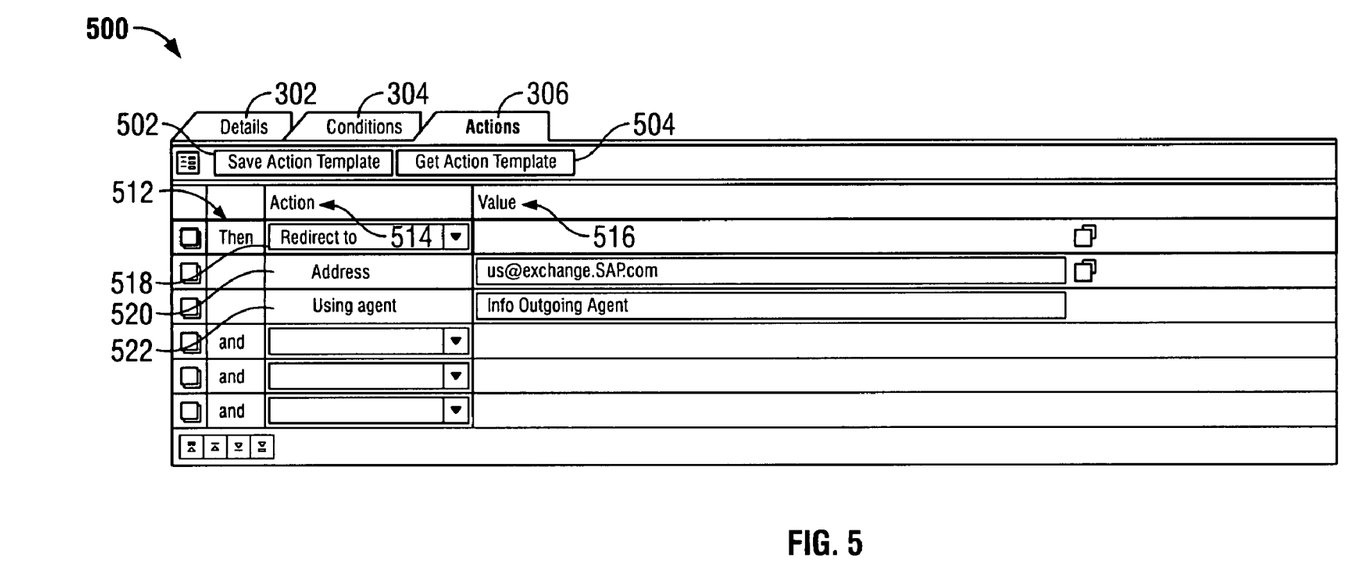
FIG. 5 is a screen diagram of a GUI that is used for viewing and modifying rule actions, according to one embodiment.

FIG. 5 is a screen diagram of a GUI 500 that is used for viewing and modifying rule actions in the rule administration system 20 shown in FIG. 1, according to one embodiment. As shown in FIG. 5, a user has selected the tab 306 to create and/or modify rule actions in columns 512, 514, and 516. Once these actions have been defined, the user may select button 502 to create and save a rule template. This rule template will be based on the actions specified by the user in the columns 512, 514, and 516.

In the column 514, the user may specify an action name and any other pertinent attribute names. In the column 514 FIG. 5, the user has selected an action name of "Redirect to", which is associated with an action of redirecting an email message to a specified recipient, and has also selected the attribute names of "Address" and "Using agent". The attribute name "Address" is associated with an email address of the specified recipient, and the attribute name "Using agent" is associated with a software agent, or process, that may be used to perform the redirect function.

Using the column 516, the user is able to specify the values that correspond to the action or attribute names selected in the column 514. As shown in FIG. 5, the user has entered a value of "us@exchange.SAP.com" corresponding to the attribute name "Address", and has also entered a value of "Info Outgoing Agent" corresponding to the attribute name of "Using agent".

The user may also use the column 512 to specify the logical operators that join multiple actions. For example, the user may select logical operators such as "and" or "or" in the column 512 when joining multiple actions.

Figure 6:
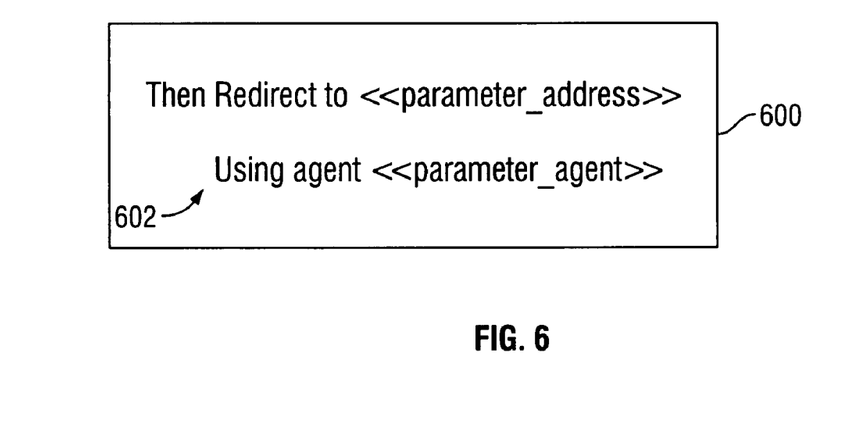
FIG. 6 is a screen diagram of a preview area for viewing a rule template that is based upon the rule actions shown in FIG. 5.

If the user wishes to create and save a template based on the user-defined actions specified in the columns 512, 514, and 516, the user may select a button 502. Upon selection, the system 20 will display a preview of a template created from the user-defined actions, as shown in FIG. 6. If the user later wishes to get a template for creating customized actions based on the template format, the user may select a button 504. In this fashion, the user is able to reuse the template several times when creating various different rule actions based on a common format.

FIG. 6 is a screen diagram of a preview area 600 for viewing a representation 602 of a rule template that is based upon the rule actions shown in FIG. 5. Once a user has defined a set of rule action using the columns 512, 514, and 516 shown in FIG. 5 and selected the button 502, the user is able to see a preview of a representation 602 of the rule template based on these actions in the preview area 600. As shown, the representation 602 contains the same action and attribute names as the actions specified in the column 514. However, the representation 602 contains value placeholders that are associated with the corresponding values shown in the column 516 in FIG. 5. For example, a first placeholder "<<parameter_address>>" is associated with the value for the attribute name "Address". This placeholder includes a name "parameter_address" and a set of placeholder symbols "<<" and ">>". A second placeholder "<<parameter_agent>>" is associated with the value for the attribute name "Using agent".

Figure 7:
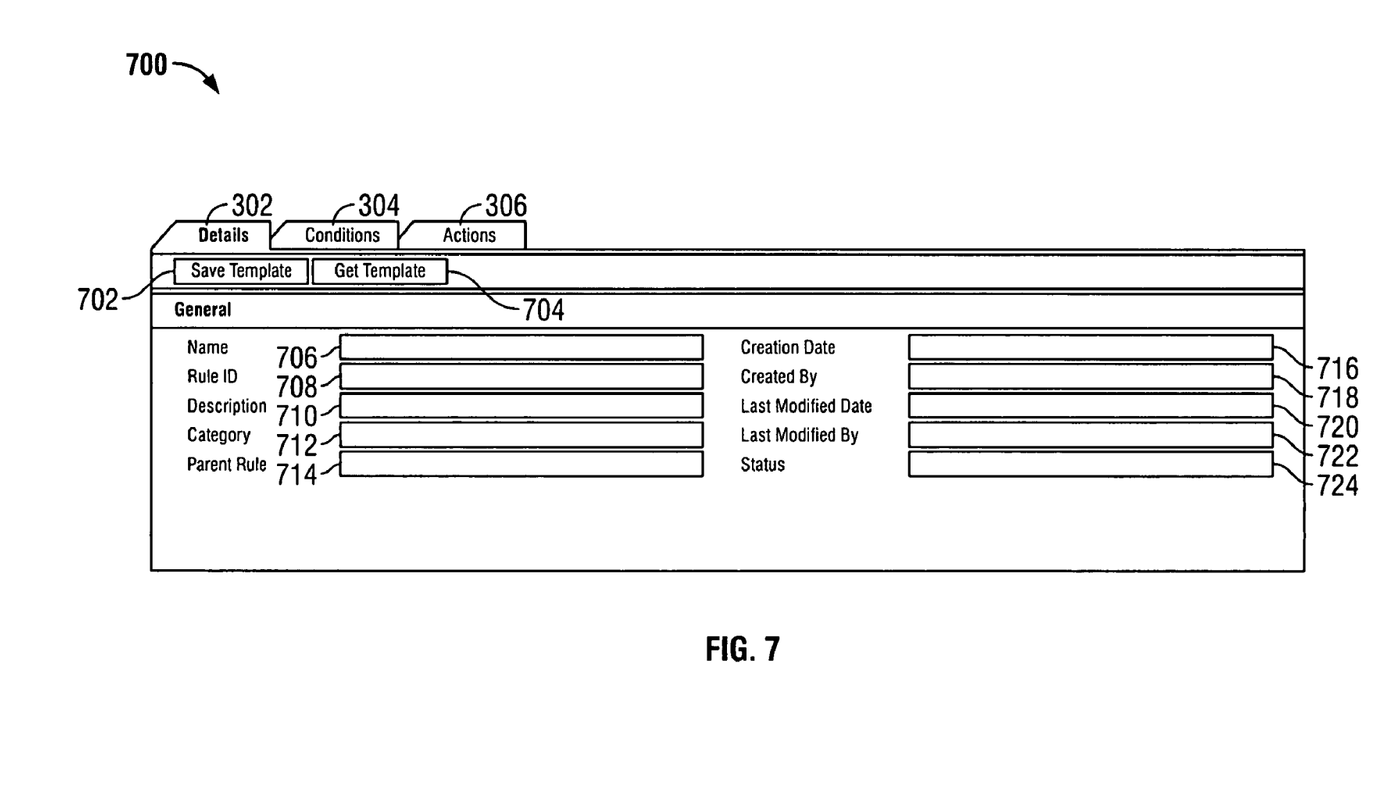
FIG. 7 is a screen diagram of a GUI that is used for creating a rule template, according to another embodiment.

FIG. 7 is a screen diagram of a GUI 700 that is used for creating a rule template in the rule administration system 20 shown in FIG. 1, according to another embodiment. In this embodiment, a user has selected the tab 302 to create or modify the details of a specific rule. If the user has previously selected the tab 304 to define one or more rule conditions and/or has previously selected the tab 306 to define one or more rule actions, the user may then select a button 702 to directly create and save a rule template using the GUI 700. This rule template will be based upon the conditions and/or actions that have been previously defined by the user, and will have a format similar to the formats shown in the preview areas 406 (FIG. 4) and 600 (FIG. 6). The rule template will have a first portion that corresponds to the user-defined conditions (similar in format to the preview area 406) and a second portion that corresponds to the user-defined actions (similar in format to the preview area 600). By selecting the button 702 on the GUI 700, the user is capable of creating and saving a rule template having these first and second portions in one step. The user may later access and use the rule template for creating customized rules by selecting a button 704. Once the user selects the button 704, the user may select the corresponding rule template. Upon selection, the user may enter values for each of the placeholders shown to create a customized rule having one or more conditions and/or actions. In this fashion, the user is able to reuse the rule template several times when creating various different rules based on a common format specified by the rule template.

The GUI 700 also includes many other text-entry fields 706-724 in the details section. The user may specify the details of the rule by entering textual information into each of these fields. The user may enter textual information into the field 706 to specify a rule name. The user may enter textual information into the field 708 to specify a unique identifier to be associated with the rule. The user may enter textual information into the field 710 to provide a brief description of the rule. The user may enter textual information into the field 712 to specify a category for the rule. The user may choose to specify such a category if the rule has a logical relation to other rules that have been previously created. The user may enter textual information into the field 714 to specify a name of a parent rule. A parent rule is one that includes a set of similar conditions and actions. The user may enter textual information into the field 716 to specify the creation date of the rule. The user may enter textual information into the field 718 to specify the creator of the rule. The user may enter textual information into the field 720 to specify the last modification date of the rule. The user may enter textual information into the field 722 to specify the individual who last modified the rule. The user may enter textual information into the field 724 to specify a current status (e.g., draft, final, etc.) of the rule.

Figure 8:
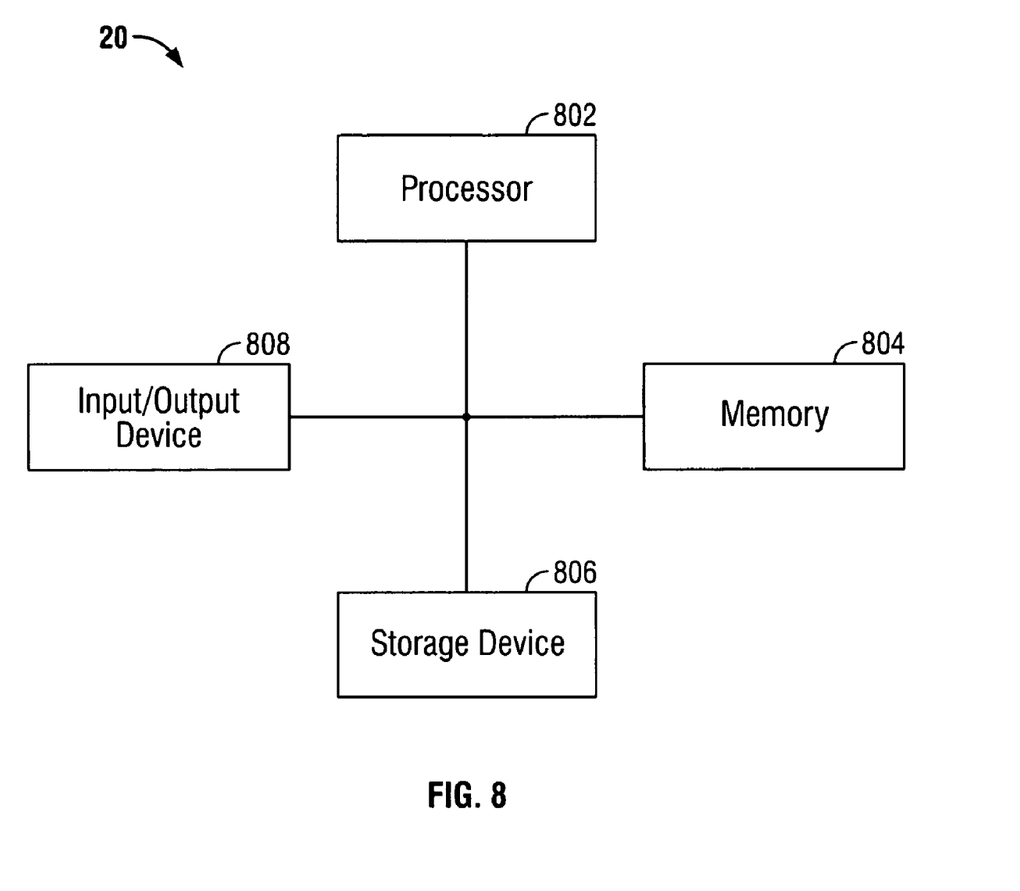
FIG. 8 is a block diagram of a computing system that can be utilized for displaying the various GUI's shown in the preceding figures, according to one embodiment.

FIG. 8 shows a block diagram of a computing system 20 that can be utilized for displaying the various GUI's shown in the preceding figures, according to one embodiment. In the example shown in FIG. 8, the computing system 20 is the rule administration system shown in FIG. 1. The computing system 20 includes a processor 802, a memory 804, a storage device 806, and an input/output device 808. Each of the components 802, 804, 806, and 808 are interconnected using a system bus. The processor 802 is capable of processing instructions for execution within the computing system 20. In one embodiment, the processor 802 is a single-threaded processor. In another embodiment, the processor 802 is a multi-threaded processor. The processor 802 is capable of processing instructions stored in the memory 804 or on the storage device 806 to display graphical information for a GUI on the input/output device 808.

The memory 804 stores information within the computing system 20. In one embodiment, the memory 804 is a computer-readable medium. In one embodiment, the memory 804 is a volatile memory unit. In another embodiment, the memory 804 is a nonvolatile memory unit.

The storage device 806 is capable of providing mass storage for the computing system 20. In one embodiment, the storage device 806 is a computer-readable medium. In various different embodiments, the storage device 806 may be a floppy disk device, a hard disk device, an optical disk device, or a tape device.

The input/output device 808 provides input/output operations for the computing system 20. In one embodiment, the input/output device 808 includes a keyboard and/or pointing device. In one embodiment, the input/output device 808 includes a display unit for displaying the various GUI's shown in the preceding figures.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:

displaying a graphical user interface (GUI) on a display device of a computer, the GUI including a representation of a condition of a user-defined rule to process textual information and a representation of an action of the user-defined rule to process textual information, wherein the condition includes an attribute name, an operator, and an attribute value and wherein the action includes an action name and an action value;

receiving user input via the GUI, the user input indicating the user-defined rule is to be used to create a rule template;

creating, in response to the received user input, a rule template having a condition that is based upon the condition of the user-defined rule and an action that is based upon the action of the user-defined rule, wherein the condition of the rule template includes the attribute name and the operator from the corresponding condition of the user-defined rule, wherein the condition of the rule template further includes an attribute-value placeholder that is associated with the attribute value from the corresponding condition of the user-defined rule, wherein the action of the rule template further includes the action name from the corresponding action of the user-defined rule, and wherein the action of the rule template further includes action-value placeholder that is associated with the action value from the corresponding action of the user-defined rule;

receiving a second user input that indicates a value to be used in place of the attribute-value placeholder and a value to be used in place of the action-value placeholder;

creating, in response to the second user input, a second user-defined rule to process textual information, the second user-defined rule being based on the rule template and including the value to be used in place of the attribute-value placeholder and the value to be used in place of the action-value placeholder;

storing the second user-defined rule in computer-readable medium on a storage device for later use in processing textual information, wherein the second user-defined rule includes a condition that includes the attribute name of the condition of the rule template, the operator of the condition of the rule template, an attribute value corresponding to the value to be used in place of the attribute-value placeholder, and wherein the second user-defined rule further includes an action that includes the action name of the action of the rule template and an action value corresponding to the value to be used in place of the action-value placeholder;

using the second user-defined rule to process incoming textual information received from a customer system; and triggering the action of the second user-defined rule when the incoming textual information satisfies the condition of the second user-defined rule.

2. The computer-implemented method of claim 1, wherein storing the rule template in computer-readable medium on a storage device comprises storing the rule template in a repository that is accessible to the user.

3. The computer-implemented method of claim 1, wherein the user-defined rule contains a plurality of conditions that each include an attribute name, an operator, and an attribute value.

4. The computer-implemented method of claim 3, wherein the conditions of the user-defined rule are connected by at least one logical operator.

5. The computer-implemented method of claim 3, wherein the rule template contains a plurality of conditions that each correspond to one of the conditions of the user-defined rule and that each include the attribute name and the operator from the corresponding condition of the user-defined rule.

6. The computer-implemented method of claim 5, wherein the conditions of the rule template are connected by at least one logical operator.

7. The computer-implemented method of claim 1, wherein the attribute-value placeholder in the condition of the rule template includes at least one placeholder symbol and a placeholder name.

8. The computer-implemented method of claim 7, wherein the placeholder name is based on the attribute name of the corresponding condition of the user-defined rule.

9. The computer-implemented method of claim 1, wherein the incoming textual information comprises textual information contained in email messages or in search queries.

10. The computer-implemented method of claim 1, wherein the user-defined rule contains a plurality of actions that each include an action name and a value.

11. The computer-implemented method of claim 10, wherein the rule template contains a plurality of actions that each correspond to one of the actions of the user-defined rule and that each include the action name from the corresponding action of the user-defined rule.

12. The computer-implemented method of claim 1, wherein the value placeholder in the action of the rule template includes at least one placeholder symbol and a placeholder name.

13. The computer-implemented method of claim 12, wherein the placeholder name is based on the action name of the corresponding action of the user-defined rule.

14. A computer-readable medium having computer-executable instructions contained therein, that when executed, create a user-defined rule, the medium configured to:

display a graphical user interface (GUI) on a display device of a computer, the GUI including a representation of a condition of a user-defined to process textual information and a representation of an action of the user-defined rule to process textual information, wherein the condition includes an attribute name, an operator, and an attribute value and wherein the action includes an action name and an action value;

receive user input via the GUI, the user input indicating the user-defined rule is to be used to create a rule template;

create, in response to the received user input, a rule template having a condition that is based upon the condition of the user-defined rule and an action that is based upon the action of the user-defined rule, wherein the condition of the rule template includes the attribute name and the operator from the corresponding condition of the user-defined rule, wherein the condition of the rule template further includes an attribute-value placeholder that is associated with the attribute value from the corresponding condition of the user-defined rule;

wherein the action of the rule template further includes the action name from the corresponding action of the user-defined rule, and wherein the action of the rule template further includes action-value placeholder that is associated with the action value from the corresponding action of the user-defined rule;

receive a second user input that indicates a value to be used in place of the attribute-value placeholder and a value to be used in place of the action-value placeholder;

create, in response to the second user input, a second user-defined rule to process textual information, the second user-defined rule being based on the rule template and including the value to be used in place of the attribute-value placeholder and the value to be used in place of the action-value placeholder;

storing the second user-defined rule in computer-readable medium on a storage device for later use in processing textual information, wherein the second user-defined rule includes a condition that includes the attribute name of the condition of the rule template, the operator of the condition of the rule template, an attribute value corresponding to the value to be used in place of the attribute-value placeholder, and wherein the second user-defined rule further includes an action that includes the action name of the action of the rule template and an action value corresponding to the value to be used in place of the action-value placeholder;

using the second user-defined rule to process incoming textual information received from a customer system; and triggering the action of the second user-defined rule when the incoming textual information satisfies the condition of the second user-defined rule.

15. A system programmed to:

display a graphical user interface (GUI) on a display device of a computer, the GUI including a representation of a condition of a user-defined rule to process textual information and a representation of an action of the user-defined rule to process textual information, wherein the condition includes an attribute name, an operator, and an attribute value;

receive user input via the GUI, the user input indicating the user-defined rule is to be used to create a rule template;

create, in response to the received user input, a rule template having a condition that is based upon the condition of the user-defined rule and an action that is based upon the action of the user-defined rule,     wherein the condition of the rule template includes the attribute name and the operator from the corresponding condition of the user-defined rule,     wherein the condition of the rule template further includes an attribute-value placeholder that is associated with the attribute value from the corresponding condition of the user-defined rule,     wherein the action of the rule template further includes the action name from the corresponding action of the user-defined rule, and     wherein the action of the rule template further includes action-value placeholder that is associated with the action value from the corresponding action of the user-defined rule;

receive a second user input that indicates a value to be used in place of the attribute- value placeholder; and create, in response to the second user input, a second user-defined rule to process textual information, the second user-defined rule being based on the rule template and including the value to be used in place of the attribute-value placeholder and the value to be used in place of the action-value placeholder;

storing the second user-defined rule in computer-readable medium on a storage device for later use in processing textual information,     wherein the second user-defined rule includes a condition that includes the attribute name of the condition of the rule template, the operator of the condition of the rule template, an attribute value corresponding to the value to be used in place of the attribute-value placeholder, and     wherein the second user-defined rule further includes an action that includes the action name of the action of the rule template and an action value corresponding to the value to be used in place of the action-value placeholder;

using the second user-defined rule to process incoming textual information received from a customer system; and triggering the action of the second user-defined rule when the incoming textual information satisfies the condition of the second user-defined rule.

\* \* \* \* \*